United States Patent [19]

Nakatani et al.

[11] Patent Number: 4,485,441
[45] Date of Patent: Nov. 27, 1984

[54] CLERK SHARE CALCULATION IN AN ELECTRONIC CASH REGISTER

[75] Inventors: Hiroshi Nakatani, Yamatokoriyama; Hachizou Yamamoto, Nara, both of Japan

[73] Assignee: Sharp Kabushiki Kaisha, Osaka, Japan

[21] Appl. No.: 311,272

[22] Filed: Oct. 14, 1981

[30] Foreign Application Priority Data

Oct. 20, 1980 [JP] Japan ................. 55-147121

[51] Int. Cl.³ .................. G06F 15/24; G06F 7/48
[52] U.S. Cl. ........................ 364/405; 364/900
[58] Field of Search .......... 364/400, 401, 402, 403, 364/404, 405, 200, 900

[56] References Cited

U.S. PATENT DOCUMENTS

| | | | |
|---|---|---|---|
| 3,944,801 | 3/1976 | Montana | 364/405 |
| 3,946,217 | 3/1976 | Tsujikawa et al. | 364/405 |
| 3,963,910 | 6/1976 | Enomoto et al. | 364/405 |
| 4,220,991 | 9/1980 | Hamano et al. | 364/405 |
| 4,398,250 | 8/1983 | Hosono | 364/404 |

Primary Examiner—Felix D. Gruber
Assistant Examiner—Daniel K. Dorsey
Attorney, Agent, or Firm—Birch, Stewart, Kolasch & Birch

[57] ABSTRACT

An electronic cash register functions to accumulate the transaction data registered into the electronic cash register in the clerk by clerk fashion. A preset system is provided for presetting a desired share percentage for each of the clerks, and the preset share percentage is memorized in a share percentage memory. When the read out mode operation is conducted, the turnover data is printed out onto a read slip in the clerk by clerk fashion. In the read out mode operation, the share percentage is read out from the share percentage memory in order to automatically obtain the share of the clerk through the use of the memorized share percentage and the accumulated turnover data.

7 Claims, 5 Drawing Figures

BACKGROUND ART 4,485,441

CLERK SHARE CALCULATION IN AN ELECTRONIC CASH REGISTER

BACKGROUND AND SUMMARY OF THE INVENTION

The present invention relates to an electronic cash register wherein transaction data is stored in the electronic cash register in the clerk by clerk fashion.

An administration system has been developed which determines a reward for a clerk by taking into account a predetermined share percentage and the amount of money registered by the clerk. In the conventional system, the transaction data is stored in a memory at a memory section assigned to each of the clerks. However, the share calculation must be manually conducted.

Accordingly, an object of the present invention is to provide an electronic cash register which automatically calculates a clerk's share.

Another object of the present invention is to provide a novel control system in an electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, transaction data is stored in a main memory in the electronic cash register in the clerk by clerk fashion. A clerk's share percentage is preset for each clerk and stored in a percentage memory. When the electronic cash register is placed in a read mode, the transaction data stored in a memory section assigned to a specific clerk is read out for administration purposes. At a same time the share percentage of the specific clerk is read out from the percentage memory to calculate the clerk's share. The thus obtained clerk's share is printed out onto a read slip, thereby facilitating the administration operation.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
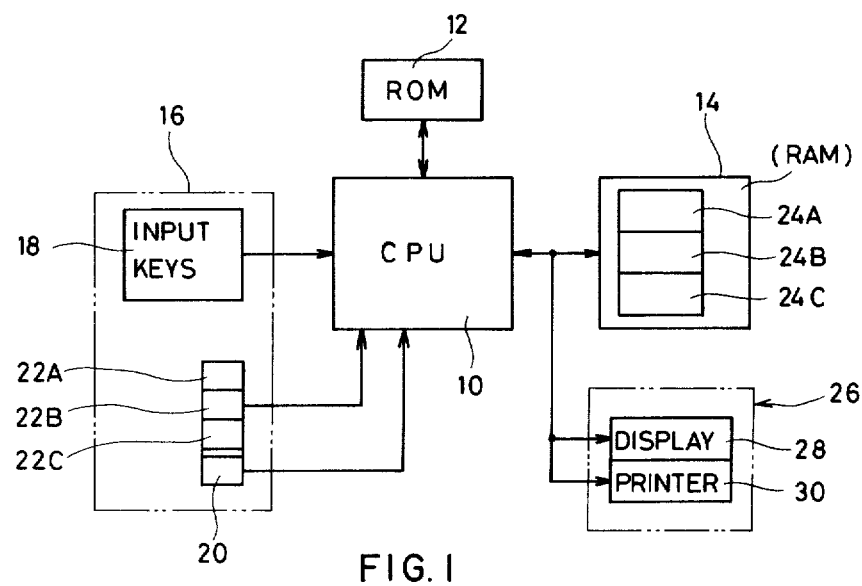
FIG. 1 is a schematic block diagram of a conventional electronic cash register.

To facilitate a better understanding of the present invention, the conventional electronic cash register will be first described with reference to FIG. 1.

The electronic cash register generally comprises a central processor unit 10 for controlling the operation of the electronic cash register, a read only memory 12 for storing microprograms to be applied to the central processor unit 10 and a random access memory 14 for storing the transaction data registered through a key input panel 16. The key input panel 16 includes numeral and function keys 18 for introducing the transaction data, a read instruction key 20 for instructing the read operation and for checking the transaction data registered in the electronic cash register for the administration purposes, and clerk selection keys 22A, 22B and 22C for identifying one of clerks. The random access memory 14 includes a first clerk memory section 24A assigned to a first clerk A, a second clerk memory section 24B assigned to a second clerk B, and a third clerk memory section 24C assigned to a third clerk C. The transaction data registered by the first clerk A is introduced and stored in the first clerk memory section 24A, the transaction data registered by the second clerk B is introduced into and stored in the second memory section 24B, and the transaction data registered by the third clerk C is introduced into and stored in the third clerk memory section 24C.

Figure 2:
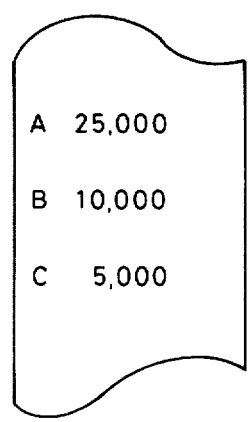
FIG. 2 is a plan view of an example of a read slip issued by the electronic cash register of FIG. 1.

When the electronic cash register of FIG. 1 is placed in the read mode and the first clerk selection key 22A is actuated, the transaction data stored in the first clerk memory section 24A is read out. The thus read out transaction data is applied to an output system 26 including a display unit 28 and a printer 30. By selecting a desired clerk through the use of the clerk selection keys 22A, 22B and 22C, the transaction data stored in each of the clerk memory sections 24A, 24B and 24C is read out. FIG. 2 shows an example of the printout in the read out mode, which shows the turnover registered by each of the clerks A, B and C.

In the conventional administration system, the clerk's share is manually calculated with reference to the read out slip as shown in FIG. 2. More specifically, the administrator manually calculates the clerk's share with reference to the turnover registered by a specific clerk and a predetermined share percentage assigned to the specific clerk. The thus obtained share is used to determine a reward for the specific clerk.

Figure 3:
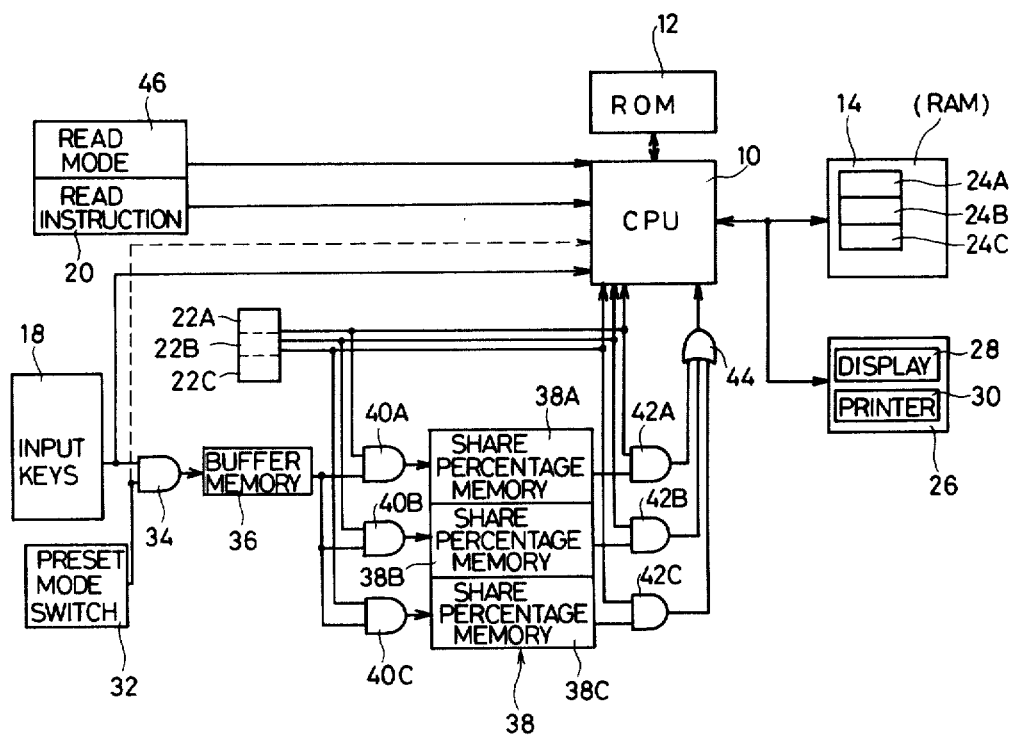
FIG. 3 is a block diagram of an embodiment of an electronic cash register of the present invention.

FIG. 3 shows an embodiment of the electronic cash register of the present invention. Like elements corresponding to those of FIG. 1 are indicated by like numerals.

The main feature of the electronic cash register of FIG. 3 resides in a preset system for presetting the clerk's share percentage for calculating the clerk's share. A preset mode switch 32 is disposed on the key input panel 16 for placing the electronic cash register in the preset mode wherein an AND gate 34 is made conductive. In the preset mode, the clerk's share percentage introduced through the numeral keys included in the input keys 18 is applied to a buffer memory 36 and temporarily stored therein. The electronic cash register of the present invention comprises a share percentage memory 38 including a first memory section 38A for storing the share percentage assigned to the first clerk A, a second memory section 38B for storing the share percentage assigned to the second clerk B and a third memory section 38C for storing the share percentage assigned to the third clerk C. When the first clerk selection key 22A is actuated in the preset mode, an AND gate 40A is made conductive to transfer the share percentage temporarily stored in the buffer memory 36 to the first memory section 38A, thereby presetting the share percentage of the first clerk A. In the same manner, when the second clerk selection key 22B is actuated in the preset mode, an AND gate 40B is made conductive to introduce the share percentage of the second clerk B into the second memory section 38B of the share percentage memory 38, and when the third clerk selection key 22C is actuated in the preset mode, the share percentage of the third clerk C, which is temporarily stored in the buffer memory 36, is introduced through an AND gate 40C and stored in the third memory section 38C of the share percentage memory 38.

AND gates 42A, 42B and 42C are connected to each of the output terminals of the memory sections of the share percentage memory 38, respectively. That is, the share percentage stored in the first memory section 38A of the share percentage memory 38 is applied to the central processor unit 10 through the AND gate 42A and an OR gate 44 when the first clerk selection key 22A is actuated in the read mode. The AND gate 42B is made conductive when the second clerk selection key 22B is actuated, whereby the share percentage assigned to the second clerk B, which is stored in the second memory section 38B, is applied to the central processor unit 10 through the OR gate 44. The AND gate 42C is made conductive when the third clerk selection key 22C is actuated, whereby the share percentage stored in the third memory section 38C of the share percentage memory 38 is applied to the central processor unit 10.

A read mode switch 46 is disposed on the key input panel to place the electronic cash register in the read mode. A read mode selection signal derived from the read mode switch 46 and the read instruction signal derived from the read instruction key 20 are applied to the central processor unit 10. The numeral data and the operation instruction signals derived from the input keys 18 are introduced into the central processor unit 10 for registering the transaction data. Further, a preset mode signal derived from the preset mode switch 32 is applied to the central processor unit 10 in order to place the electronic cash register in the preset mode. The central processor unit 10 performs various functions in accordance with the microprograms stored in the read only memory 12.

In a preferred form, the central processor unit 10 is made with a μCOM 87 manufactured by Nippon Electric Co., Ltd. The random access memory 14 is made with a μPD 440D manufactured by Nippon Electric Co., Ltd. and the read only memory 12 is made with a μPD 7801 manufactured by Nippon Electric Co., Ltd.

The electronic cash register of FIG. 3 operates in the following manner.

[PRESET MODE]

The clerk's share percentage must be preset before initiating the registration operation. When the preset mode switch 32 is actuated, the electronic cash register is placed in the preset mode and the AND gate 34 is made conductive. Under these conditions the share percentage assigned to the first clerk A is introduced from the numeral keys included in the input keys 18. The numeral data is applied to the buffer memory 36 via the AND gate 34 and temporarily stored therein. Then, the first clerk selection key 22A is actuated to open the AND gate 40A, thereby introducing the share percentage into the first memory section 38A of the share percentage memory 38. In a same manner, the share percentage for the second clerk B is preset in the second memory section 38B of the share percentage memory 38, and the share percentage for the third clerk C is introduced into and stored in the third memory section 38C of the share percentage memory 38. After completion of the preset operation, the preset mode switch 32 is switched off to terminate the preset mode operation.

[REGISTRATION MODE]

When the preset mode switch 32 is switched off, the AND gate 34 is made non-conductive and, therefore, the transaction data introduced from the input keys 18 is applied to the central processor unit 10. The central processor unit 10 controls the normal registration operation in accordance with the microprograms stored in the read only memory 12. When the registration operation is conducted by the first clerk A, the first clerk selection key 22A is actuated. Therefore, the transaction data registered by the first clerk A is introduced into and accumulated in the first clerk memory section 24A in the random access memory 14. The transaction data registered by the second clerk B is accumulated in the second clerk memory section 24B, and the transaction data registered by the third clerk C is accumulated in the third clerk memory section 24C in the random access memory 14 as in the case of the conventional electronic cash register shown in FIG. 1.

[READ MODE]

Figure 4:
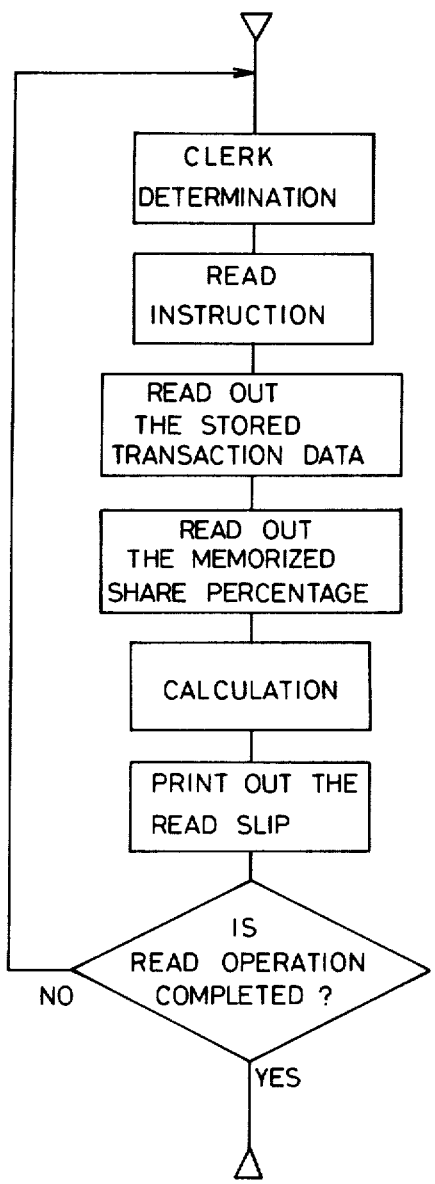
FIG. 4 is a flow chart for explaining a read operation conducted by the electronic cash register of FIG. 3.

When the administrator desires to check the merchandise conditions of each of the clerks, the read mode switch 46 is actuated to apply the read mode signal to the central processor unit 10. The central processor unit 10 performs the read operation in accordance with the flow chart shown in FIG. 4.

Figure 5:
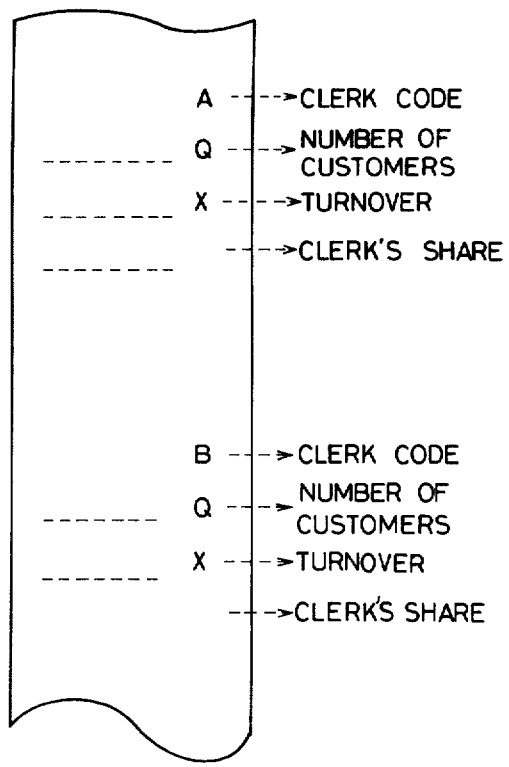
FIG. 5 is a plan view of an example of a read slip issued by the electronic cash register of FIG. 3.

When the first clerk selection key 22A is actuated in the read mode, the AND gate 42A is opened in order to introduce the share percentage stored in the first memory section 38A of the share percentage memory 38 into the central processor unit 10 through the OR gate 44. The thus introduced share percentage data is temporarily stored in the central processor unit 10. Then, the read instruction key 20 is actuated to initiate the read operation. The central processor unit 10 functions to read out the transaction data accumulated in the first clerk memory section 24A in the random access memory 14. The turnover data or transaction amount data read out from the first clerk memory section 24A is multiplied by the share percentage temporarily stored in the central processor unit 10, thereby obtaining the share of the first clerk A. The thus obtained turnover or transaction amount registered by the first clerk A and the share of the first clerk A is printed out onto a read slip as shown in FIG. 5.

The read operation for the second clerk B and the third clerk C is conducted in the same manner. In a preferred form, the microprograms stored in the read only memory 12 are constructed to skip the share printout when the share percentage is zero (0) in order to expedite the read mode operation. It is clear from the foregoing that the clerk number is not limited to three.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:

transaction data memory means for storing transaction data registered into the electronic cash register, said transaction data memory means including a plurality of data memory sections each of which is assigned to accumulate the transaction amount data registered by a specific clerk;

share percentage memory means having a plurality of share percentage memory section means, each for storing a share percentage determined for a specific clerk;

read operation control means operatively connected to said transaction data memory means for reading out said transaction data accumulated in said plurality of data memory sections of said transaction data memory means; and share calculation control means operatively connected to said share percentage memory means and said read operation control means for reading out said share percentage stored in a selected one of said share percentage memory section means corresponding to a selected one of said data memory sections from which said transaction data is being read out, and for multiplying said transation amount data read out from said one of said data memory sections with said share percentage read out from said corresponding one of said share percentage memory section means corresponding thereto, thereby obtaining a share of said specific clerk.

2. The electronic cash register of claim 1, further comrising:

preset control means connected to said share percentage memory means for presetting a desired share percentage into each of said plurality of share percentage memory section means included in said share percentage memory means.

3. The electronic cash register of claim 2, wherein said present control means comprises:

numeral keys for introducing a desired percentage number into the electronic cash register;

buffer memory means responsive to said numeral keys for temporarily storing the percentage number introduced from said numeral keys;

preset mode enable means connected to said input keys and buffer memory means for placing said cash register in a preset mode by enabling passage of information from said numeral keys to said buffer means; and memory section selection means connected to said buffer memory means for introducing said percentage number temporarily stored in said buffer memory into a desired section selected from said plurality of share percentage memory sections.

4. The electronic cash register of claim 3, wherein said preset mode enable means comprises:

an AND gate disposed between said numeral keys and said buffer memory;

a preset mode switch; and gate control means for placing said AND gate in a conductive condition when said preset mode switch is actuated.

5. The electronic cash register of claim 3, further comprising:

a plurality of clerk selection keys for identifying a specific clerk; and correlation means responsive to said clerk selection keys for enabling said memory section selection means in response to a selection operation conducted to said plurality of clerk selection keys.

6. The electronic cash register of claim 1, 2, 3, 4 or 5, further comprising printer means responsive to said share calculation control means for printing out the transaction data registered into the electronic cash register.

7. The electronic cash register of claim 6, further comprising print control system means connected to said printer means for enabling said printer to further print out said transaction data accumulated in said plurality of data memory sections and said share obtained by said share calculation control means.

* * * * *